United States Patent [19]

Breen

[11] Patent Number: 4,538,197
[45] Date of Patent: Aug. 27, 1985

[54] SYNCHRONISM CHECK RELAY
[75] Inventor: Thomas B. Breen, Lansdowne, Pa.
[73] Assignee: General Electric Company, King of Prussia, Pa.
[21] Appl. No.: 571,967
[22] Filed: Jan. 18, 1984
[51] Int. Cl.³ ............................................. H02H 7/22
[52] U.S. Cl. ........................................ 361/71; 361/74; 361/75; 361/85
[58] Field of Search ............... 361/59, 71, 74, 75, 361/85; 307/87, 86, 85, 73, 72, 51, 129, 130; 340/658

[56] References Cited

U.S. PATENT DOCUMENTS

| | | |
|---|---|---|
| 2,249,513 | 7/1941 | Wurth . |
| 2,311,474 | 2/1943 | Seeley . |
| 2,445,804 | 7/1948 | Seeley . |
| 3,471,749 | 10/1969 | Harris ........................ 361/59 |
| 3,704,392 | 11/1972 | Chen et al. ................. 307/87 X |
| 3,801,796 | 4/1974 | Konrad ...................... 307/87 |
| 4,090,090 | 5/1978 | Johnston .................... 307/87 |
| 4,231,029 | 10/1980 | Johnston .................... 307/87 X |

Primary Examiner—Patrick R. Salce
Attorney, Agent, or Firm—William Freedman

[57] ABSTRACT

A synchronism check relay includes both a high set and a low set slip cut-off circuit. The low slip cut-off setting is based upon the maximum slip frequency that can be tolerated and still allow reclosing. The high slip cut-off setting is a function of the maximum phase angle difference permissible between the voltages on the bus and line sides of the circuit breaker, and the time that the line is de-energized.

27 Claims, 5 Drawing Figures

SYNCHRONISM CHECK RELAY

BACKGROUND OF THE INVENTION

This invention is related to supervisory circuits for electrical power transmission networks; and, more particularly to synchronism check relays which supervise reclosing of power circuit breakers interconnecting line and bus voltages of an AC transmission network.

Power circuit breakers are commonly provided to couple a line voltage to a bus voltage in AC transmission networks. The power circuit breaker is typically controlled by a monitoring system which, upon detection of a fault within a particular portion of the AC transmission network, commands the power circuit breaker for that particular portion to open, thereby decoupling it from the network.

It is desirable that the power circuit breaker remain in its open position until the fault has been corrected or dissipates itself. The circuit breaker should then be reclosed unless abnormal conditions such as excessive phase angle differences and/or excessive slip frequency differences between the line and bus voltages of the transmission network are present. It is desirable to provide means to determine if the phase angle and slip frequencies between the line and bus voltages are within allowable limits prior to reclosing the power circuit breaker. It is further desirable to provide means for determining the phase angle and slip frequency differences in a minimum amount of time in order to allow for high speed reclosing operations.

Typically, a synchronism check function checks the angle between the voltages on the bus and line sides of the power circuit breaker and will provide an output which enables the breaker to close if the angle is within set limits for a set period of time. The combination of angle and time settings establishes the slip cut-off frequency; that is the slip frequency above which the synchronism check function will not permit reclosing. For any given closing angle, a lower slip cut-off will result in a longer time delay. Since this time delay is introduced for all measurements, a requirement for high speed reclosing and low slip cut-off settings may result in conflict. Consequently, it is desirable to provide a synchronous check relay which permits fast reclosing while setting a reasonably low slip cut-off frequency.

Accordingly, it is an object of the present invention to provide supervisory means whose determination of reclosing of the power circuit breaker is accomplished in an relatively short period of time in order to permit fast reclosing operations.

It is another object of the present invention to provide supervisory means for monitoring phase angles and slip frequencies between bus and line voltages on each side of an open power circuit breaker in an AC power transmission network and to quickly determine that they are within predetermined limits in order to enable high speed reclosing of the breaker.

It is another object of the present invention to provide means for setting the allowable limits of the phase angle and slip frequency differences that are easily adjustable in order to accommodate requirements of various AC transmission networks.

It is a further object of the present invention to provide highly reliable devices in order to provide a highly secure supervisory means.

These and other objects of the present invention will become apparent to those skilled in the art upon consideration of the following description of the invention.

SUMMARY OF THE INVENTION

The present invention comprises a synchronism check relay for supervising the reclosing of a power circuit breaker of an AC transmission network. In accordance with one preferred embodiment of the invention, a circuit arrangement for detecting and comparing the phase angle and slip frequency differences between a first and second portion of an AC transmission line, capable of being interconnected by a power circuit breaker, is provided. The circuit arrangement compares phase angle and slip frequency differences between the first and second portions to respective preselected phase angle and slip frequency allowable limits, which when equalled or exceeded, inhibit the circuit breaker from interconnecting the first and second portions of the transmission line.

The circuit includes input means for receiving first and second signals respectively representative of the voltage of the first and second portions of the transmission line. The input means develops third, fourth and fifth signals respectively representative of the voltage of the first portion, the voltage of the second portion, and a voltage of the first portion which has been shifted by a phase angle of 90°. The circuit also includes means for generating a clock signal proportional to the frequency supplying the AC transmission line, as well as preselectable means for setting the desired phase angle and slip frequency allowable limits.

Also included are means responsive to the clock signal and the third, fourth and fifth signals for developing a signal which indicates that the slip-frequency limit has been exceeded, and means responsive to the clock signal, the third, the fourth and fifth signals for developing a signal which indicates that the phase angle difference limit has been exceeded.

The features of the invention believed to be novel are set forth with particularity in the appended claims. The invention, itself, both as to its organization and operation, together with further objects and advantages thereof, may best be understood by reference to the following description taken in conjunction with the accompanying drawing.

DETAILED DESCRIPTION OF THE PREFERRED EMBODIMENT

In the following description, reference is made to specific, commercially available integrated circuit components by manufacturer type. In particular, the preferred embodiment described hereinafter refers to components manufactured by RCA and Motorola which are respectively described in the "RCA COS/MOS Integrated Circuits", published by RCA Corp. in 1980; and the "Motorola CMOS Integrated Circuits" manual, Series C, Third Printing, published by Motorola, Inc. 1978. The descriptions set forth in these publications, of the specific integrated circuit components referred to in the following detailed description of the preferred embodiment, are incorporated by reference in this description of the preferred embodiment as if fully set forth herein.

Figure 1:
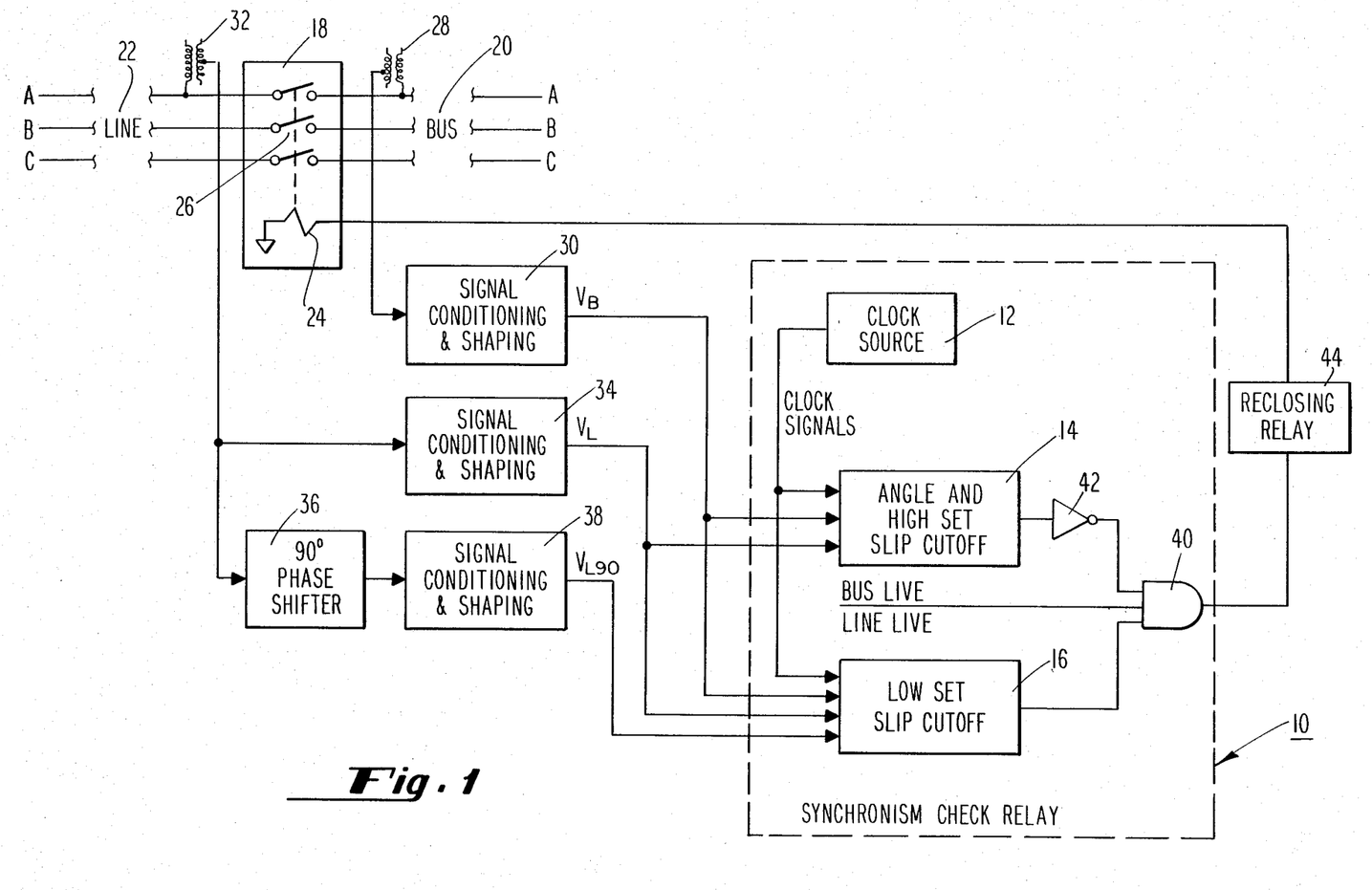
FIG. 1 is a functional block diagram depicting a preferred embodiment of a synchronism check relay in accordance with the present invention.

Referring to FIG. 1, there is shown a functional block diagram depicting a preferred embodiment of a synchronism check relay as utilized in supervising the reclosing of a circuit breaker in accordance with the present invention. The synchronism check relay, generally designated 10, comprises a clock source 12, and angle and high set slip cut-off circuit 14 and a low set slip cut-off circuit 16.

A power circuit breaker 18 is connected between a bus portion 20 and a line portion 22 of an AC power transmission network. The power circuit breaker 18 has an operating coil 24 and a set of contacts 26 which are depicted in their open position. With the contacts 26 of the power circuit breaker 18 in their open position as shown in FIG. 1, the line portion 22 is disconnected from the bus portion 20. The contacts 26 move from the open position to the closed position under the control of coil 24.

A signal, representative of the bus voltage of phase A, is coupled from a first potential transformer 28 to the input of a first signal conditioning and shaping network 30. A signal representative of the line voltage of phase A, is coupled from a second potential transformer 32 to the input of a second signal conditioning and shaping network 34 and the input of a 90° phase shifter 36. The output of the 90° phase shifter 36 is a signal which has been shifted 90° out of phase with respect to the input signal. The output signal of phase shifter 36 is coupled to the input of a third signal conditioning and shaping network 38. The first, second and third signal conditioning and shaping networks, 30, 34 and 38 respectively, buffer and convert their respective sinusoidal input signals to square wave signals, and level shifts these signals to values which are compatible with the logic circuitry in the synchronism check relay 10.

The output ($V_B$) of the first signal conditioning and shaping network 30 is a signal having the same phase and frequency of the phase A voltage on the bus portion 20 of the AC transmission network. The output ($V_L$) of the second signal conditioning and shaping network 34 is a signal having the same phase and frequency as the phase A voltage appearing on the line portion 22. The output ($V_{L90}$) of the third signal conditioning and shaping network 38, is a signal having the same frequency as the voltage appearing on phase A of the line portion 22 but which has been shifted by 90°.

$V_B$ is coupled to an input of the angle and high set slip cut-off network 14 as well as to an input of the low set slip cut-off network 16. $V_L$ is applied to an input of the angle and high set slip cut-off network 14 and an input of the low set slip cut-off network 16. $V_{L90}$ is coupled to an input of the low set slip cut-off network 16. Clock signals from the clock source 12 are coupled to inputs of the angle and high set slip cut-off network 14 and the low set slip cut-off network 16. The output from the angle and high set slip cut-off network 14 is coupled to one input of a three input AND gate 40 through an inverter 42. The output of the low set slip cut-off network 16 is coupled to a second input of the two input AND gate 40. A logic signal, representative of the coincidence of live voltages on both the bus and line sides of circuit breaker 18, is coupled to the third input of AND gate 40. The output of the three input AND gate 40, which appears upon coincidence of signals applied to the three inputs, is applied to an input of a reclosing relay 44. The reclosing relay 44 controls the closing of power circuit breaker 18 by application of a signal to coil 24. The reclosing relay 44 will not output a closing signal to coil 24 unless it receives an output signal from AND gate 40. The AND gate 40 is preferably an RCA COS/MOS Type CD 4073B AND gate.

Figure 2:
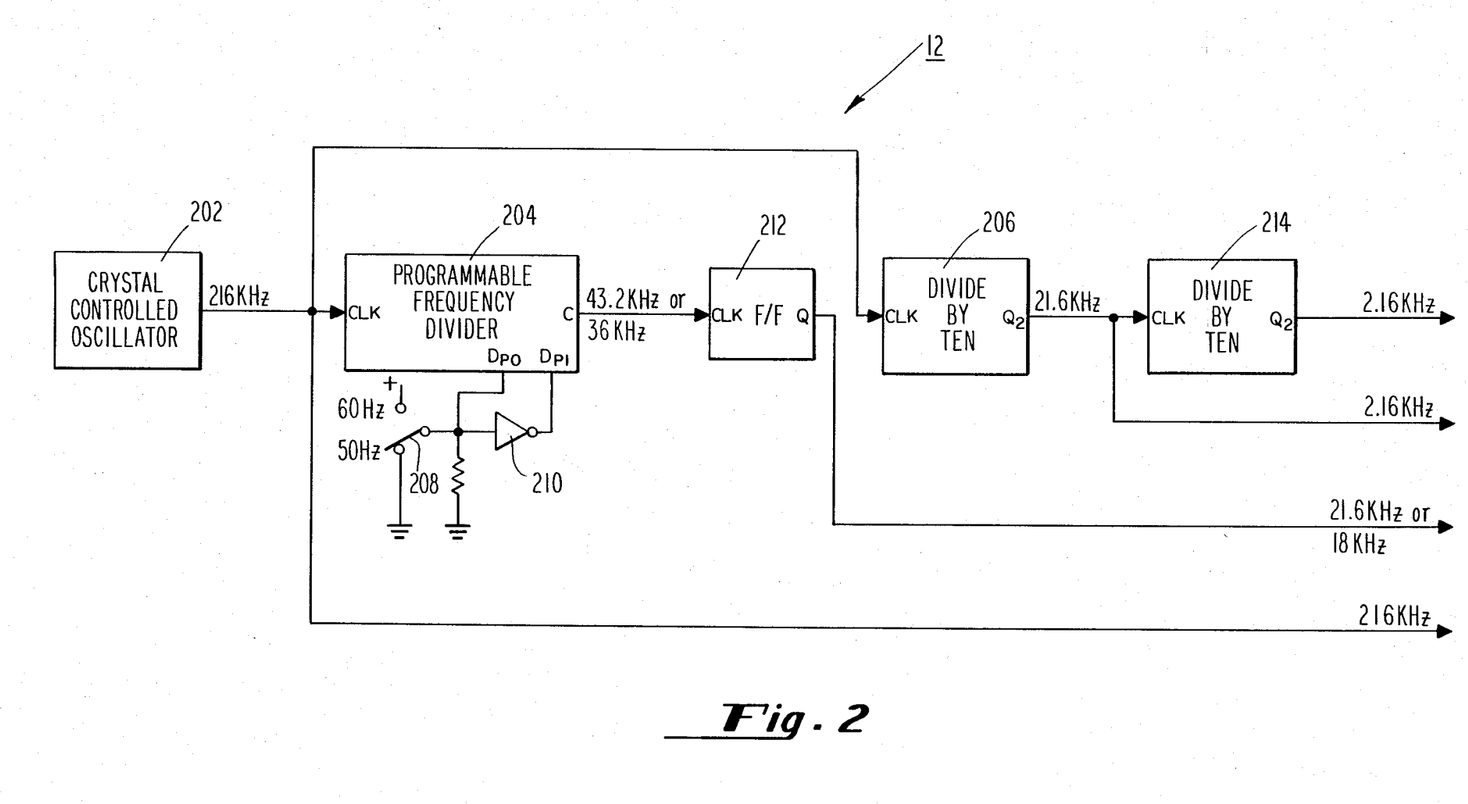
FIG. 2 is a functional block diagram of a preferred embodiment of the clock source portion of the synchronism check relay depicted in FIG. 1.

Referring now to FIG. 2, there is shown a schematic block diagram of the clock source 12. The clock source 12 comprises a crystal controlled oscillator 202 which produces a clock signal having a frequency of two hundred sixteen kilohertz. The output of the crystal controlled oscillator 202 is connected to a clock input of a programmable frequency divider 204 and a clock input of a divide by ten counter 206. In the preferred embodiment, the programmable frequency divider 204 is a Motorola Type MC14522B programmable divide-by-N 4-bit counter. The output of the programmable frequency divider 204 is a signal having a frequency of either 43.2 kilohertz or 36 kilohertz depending upon the position of a switch 208. In the fifty hertz position shown in FIG. 2, switch 208 causes a logic level "0" signal to be applied to input $D_{P0}$ and a logic level "1" signal to be applied to input terminal $D_{P1}$ through an inverter 210. With a logical "1" being permanently connected to input $D_{P2}$ and a logical "0" being permanently connected to the input $D_{P3}$, the programmable frequency divider will divide the input frequency, which is two hundred sixteen kilohertz in the preferred embodiment, by six causing it to generate a signal having a frequency of thirty-six kilohertz at its output "C" terminal. When the switch 208 is in the sixty hertz position, a logical "1" will be applied to the $D_{P0}$ input terminal and a logical "0" will be applied to the $D_{P1}$ terminal through inverter 210 causing the programmable frequency divider 204 to generate an output signal having a frequency of 43.2 kilohertz. This feature permits the synchronism check relay of the present invention to be used with fifty hertz as well as sixty hertz AC power transmission systems.

The output of the programmable frequency divider 204 is applied to a clock terminal of a flip-flop 212. In the preferred embodiment, the flip-flop 212 is an RCA COS/MOS Type CD4013B "D"-type Flip-Flop. The flip-flop 212 is connected in a toggle configuration causing the output from terminal "Q" to be a signal having a frequency equal to one-half the frequency of the signal input at its "clock" terminal; consequently, the output from flip-flop 212 is a signal having a frequency equal to either 21.6 kilohertz or 18 kilohertz.

As previously stated, the clock signal from the crystal controlled oscillator 202 is connected to a clock input of the divide by ten counter 206. In the preferred embodiment, the divide by ten counter 206 is an RCA COS/-

MOS Type CD4518B, Dual Up-counter. The output signal from the "Q$_2$" terminal of the divide by ten counter 206 is a signal having a frequency of 21.6 kilohertz. This signal is coupled to a clock input of a second divide by ten counter 214. In the preferred embodiment, the second divide by ten counter 214 is an RCA COS/MOS Type CD4518B Dual Up-counter. The output signal from the "Q$_2$" terminal of the second divide by ten counter 214 has a frequency of 2.16 kilohertz.

Figure 3:
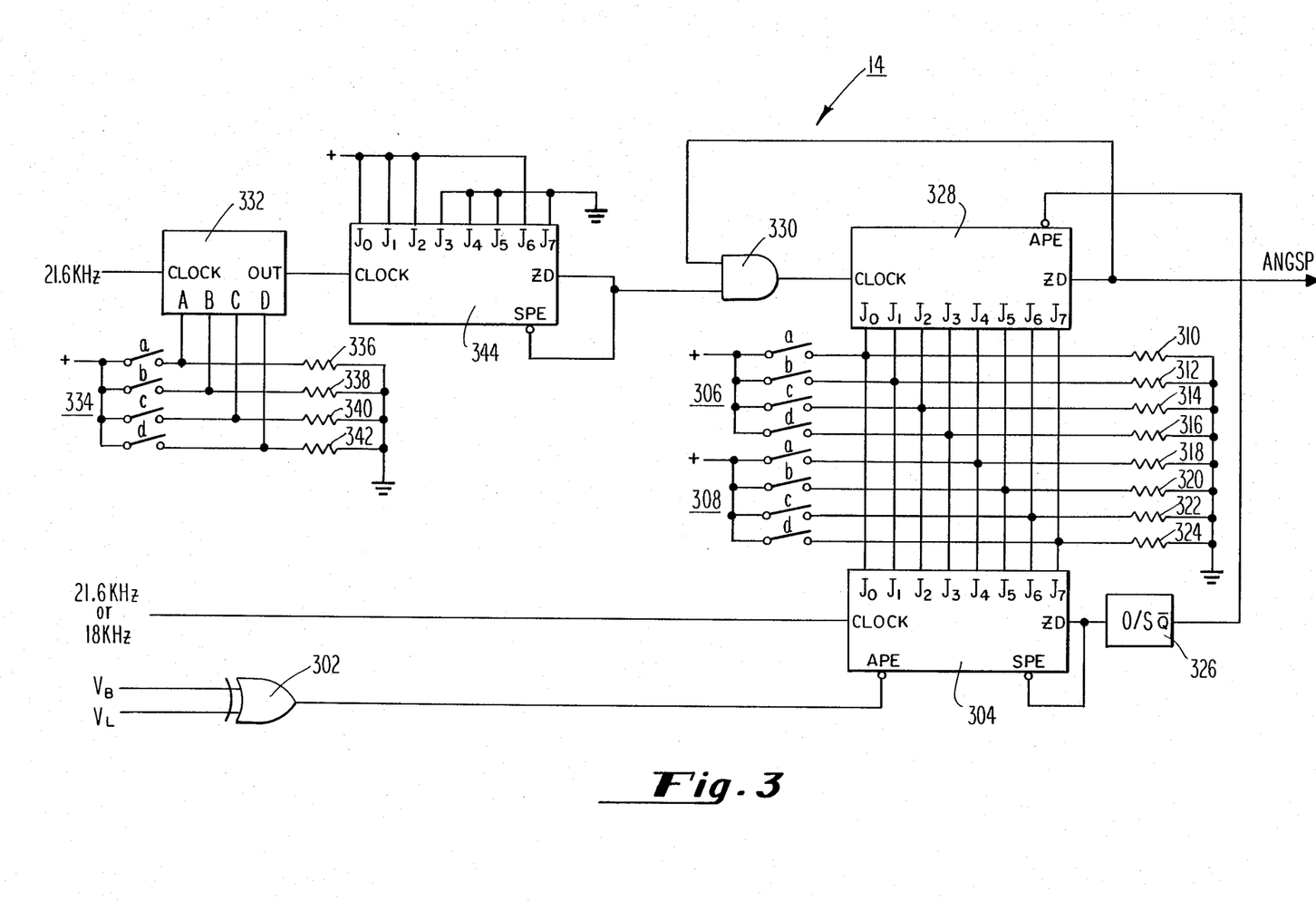
FIG. 3 is a functional block diagram of a preferred embodiment of the angle and high set slip cut-off circuit portion of the synchronism check relay depicted in FIG. 1.

Referring now to FIG. 3 there is shown a schematic block diagram of the angle and high set slip cut-off circuit 14. The circuit 14 comprises a two input exclusive OR gate 302. The V$_B$ signal from the first signal conditioning and shaping circuit 30 (see FIG. 1) is coupled to a first input of the exclusive OR gate 302, and the V$_L$ signal from the second signal conditioning and shaping network 34 is coupled to the second input of the exclusive OR gate 302. The output of the exclusive OR gate 302 is connected to an asynchronous preset enable ($\overline{APE}$) input of a first down counter 304. The exclusive OR gate 302 is preferably an RCA COS/MOS Type CD4070B Exclusive-OR gate. The first down counter 304 is preferably an RCA COS/MOS Type CD40102B 8-Stage Presettable Synchronous Down Counter.

The 21.6 kilohertz or 18 kilohertz signal output from the flip-flop 212 (see FIG. 2) is coupled to the clock input of the first down counter 304. JAM inputs J$_0$ through J$_3$ are selectably connected to logical "1" through contacts a through d respectively of a first phase angle limit set switch 306. JAM inputs J$_4$ through J$_7$ are selectably connected to logical "1" through contacts a through d respectively of a second phase angle limit set switch 308. JAM inputs J$_0$ through J$_7$ are each connected to a first terminal of resistors 310, 312, 314, 316, 318, 320, 322 and 324 respectively. The second terminal of these resistors are connected to ground. In the preferred embodiment, each of these resistors have a value of 47 K-ohms. In addition, angle limit set switches 306 and 308 are preferably thumb wheel switches, used to manually set the desired V$_B$/V$_L$ phase angle limit in one degree increments in a range of one to ninety-nine degrees. In the preferred embodiment, contacts a through d of the first phase angle limit set switch 306 have an assigned value of one, two, four and eight degrees respectively. In addition, contacts a through d of the second phase angle limit set switch 308 have an assigned value of ten, twenty, forty and eighty degrees respectively.

The down counter 304 operates as follows. A maximum count, representing a desired V$_B$/V$_L$ phase angle limit, is set into the down counter by switches 306 and 308 through JAM inputs J$_0$ through J$_7$. When the asynchronous preset enable ($\overline{APE}$) input is low, the data at the JAM inputs is asynchronously forced into the counter. The counter is then decremented by one count on each positive transition of the clock. The zero detect (ZD) output goes low when the count reaches zero. This decrementing of the count will take place as long as the $\overline{APE}$ signal remains high. As soon as $\overline{APE}$ goes low, the data, representative of contact positions of switches 306 and 308, is again entered into the counter through JAM inputs J$_0$ through J$_7$. If $\overline{APE}$ goes low before the count reaches zero, ZD will remain high.

The decrementing begins upon transition of the $\overline{APE}$ signal from low-to high and once again continues until the $\overline{APE}$ signal goes low. Consequently, if the count reaches zero before the $\overline{APE}$ signal makes its transition from high to low, an output appears at the ZD terminal which is coupled to a one shot 326. The ZD output is also coupled to the synchronous preset enable ($\overline{SPE}$) input of the down counter 304. Consequently, when the ZD output goes low after the counter has decremented to zero, a low input at the $\overline{SPE}$ terminal causes the data represented by the switch contacts of switches 306 and 308 to be clocked into the counter on the next positive clock transition, even though $\overline{APE}$ may still be high.

In the preferred embodiment, the one shot 326 is an RCA COS/MOS Type CD4538B Precision Monostable Multivibrator, electrically connected to produce an output pulse having a duration of fifteen milliseconds. This output pulse is connected to the asynchronous preset enable ($\overline{APE}$) input of a second down counter 328. The second down counter 328 is preferably an RCA COS/MOS Type CD40102B 8-Stage Presettable Synchronous Down Counter. The JAM inputs J$_0$ through J$_7$ are each selectably connected to logical "1" through contacts a through d of switch 306 and contacts a through d of switch 308 as well as the first terminals of resistors 310, 312, 314, 316, 318, 320, 322 and 324 respectively. The second down counter 328 functions in the same manner as that previously described for the first down counter 304. The zero detect (ZD) output of the second down counter 328 is coupled to one input of a two input AND gate 330. The output of the AND gate 330 is coupled to the clock input of the second down counter 328. The AND gate 330 is preferably an RCA COS/MOS Type CD4081B AND Gate.

The 21.6 kilohertz clock from the first divide by ten circuit 206 (see FIG. 2) is connected to a clock input of a decade rate multiplier 332. In the preferred embodiment, the decade rate multiplier 332 is an RCA COS/MOS Type CD4527B BCD Rate Multiplier. BCD inputs A through D are each selectably connected to logical "1" through switch contacts a through d of a high slip frequency set switch 334 and to one terminal of resistors 336, 338, 340 and 342 respectively. The other terminals of these resistors are electrically connected to ground. The output terminal (OUT) of the decade rate multiplier 332 is coupled to a clock input of a third down counter 344. The high slip frequency set switch 334 is preferably a dip switch, used to manually set the desired high slip frequency limit in 0.25 Hz increments in a range of 0.25 to 2.25 Hz. In the preferred embodiment, contacts a through d of the high slip frequency set switch 334 have an assigned value of 0.25, 0.5, 1.0 and 2.0 Hz respectively.

The third down counter 344 is preferably an RCA COS/MOS Type CD40102B 8 Stage Presettable Synchronous Down Counter and functions in the same manner as previously described with respect to the first down counter 304. The JAM inputs J$_0$ through J$_7$, are preferably permanently connected such that inputs J$_0$ through J$_2$ and J$_6$ are connected to logical "1" and inputs J$_3$ through J$_5$ and J$_7$ are connected to logical "0". Consequently, the count to be decremented is always forty-eight. The zero detect (ZD) output is coupled to the second input of the two input AND gate 330. The ZD output is also coupled to the synchronous preset enable ($\overline{SPE}$) input of the third down counter 344. As a result, the data present at the JAM inputs J$_0$ through J$_7$ is clocked into the counter upon transition of the ZD output from low to high as previously described.

The decade rate multiplier 332 functions as follows. The output signal (OUT) has a frequency which is equal to the input frequency rate (21.6 kilohertz in the preferred embodiment) multiplied by one-tenth times the BCD input present at A through D. For example, when the BCD input is eight, set by closing contact d of high slip frequency set switch 334, there will be eight output pulses for every ten input pulses.

Figure 4:
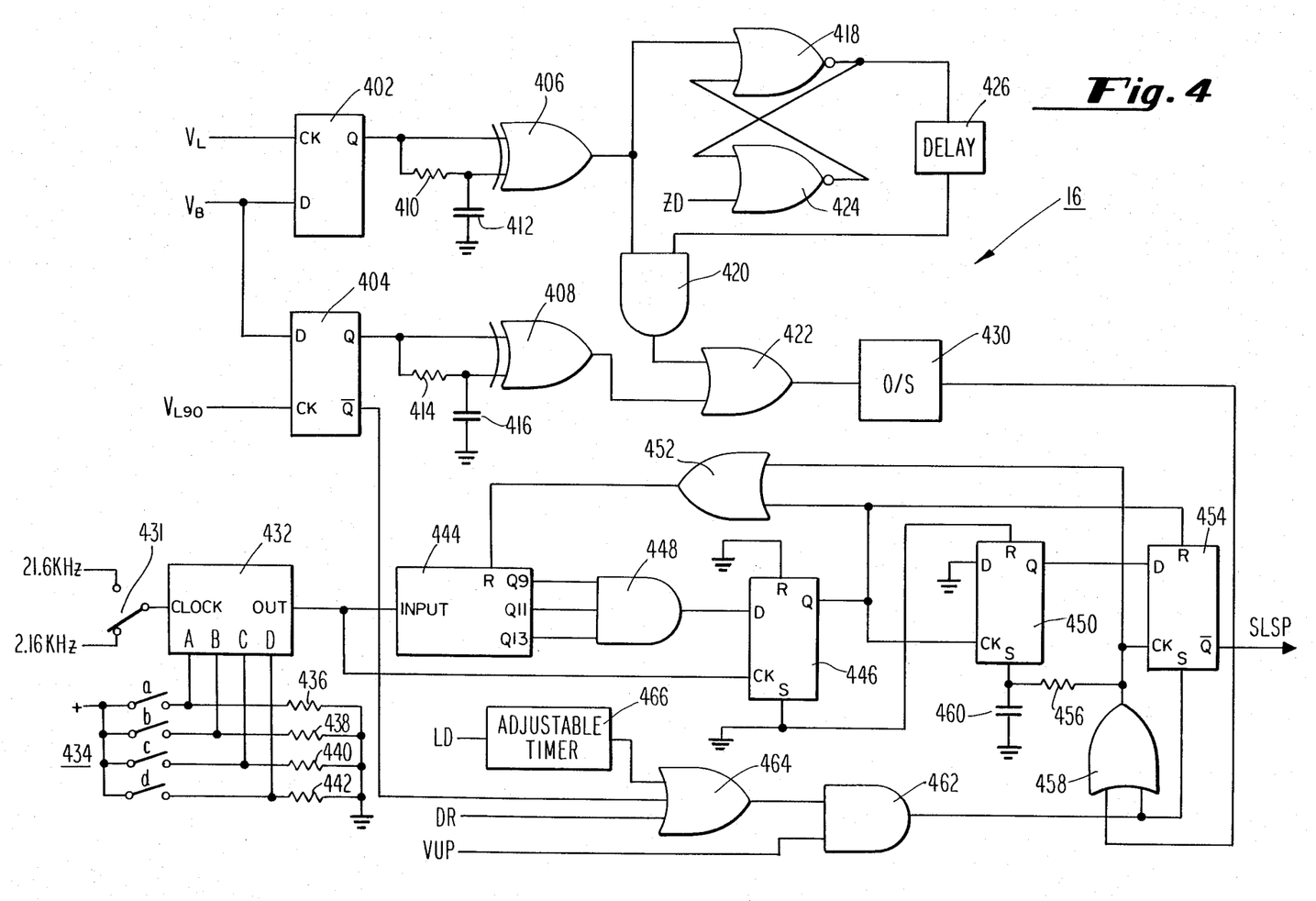
FIG. 4 is a functional block diagram of a preferred embodiment of the low set slip cut-off circuit portion of the synchronism check relay depicted in FIG. 1.

Referring now to FIG. 4, there is shown a schematic block diagram of the low set slip cut-off circuit 16. The circuit 16 comprises a first flip-flop 402 and a second flip-flop 404. In the preferred embodiment, flip-flops 402 and 404 are RCA COS/MOS Type CD4013 "D"-type Flip-flops. The $V_L$ signal from the second signal conditioning and shaping network 34 (see FIG. 1) is coupled to the clock input of the first flip-flop 402. The $V_B$ signal from the first signal conditioning and shaping network 30 (see FIG. 1) is coupled to the D input of the first flip-flop 402 and the D input of the second flip-flop 404. The $V_{L90}$ signal from the third signal conditioning and shaping network 38 (see FIG. 1) is coupled to the clock input of the second flip-flop 404.

The Q output from the first flip-flop 402 is coupled to one input of a two input exclusive OR gate 406. The Q output of the second flip-flop 404 is coupled to one input of a second two input exclusive OR gate 408. In the preferred embodiment, the exclusive OR gates 406 and 408 are RCA COS/MOS Type CD4070B Exclusive-OR Gates. The second input of the first exclusive OR gate 406 is electrically connected to one terminal of a resistor 410 and one terminal of a capacator 412. The resistor preferably has a value of 100 K-ohms and the capacitor a value of 470 pf. The second terminal of the resistor 410 is electrically connected to the first input of the exclusive OR gate 406 and the second terminal of the capacitor 412 is electrically connected to ground.

The second input of the second two input exclusive OR gate 408 is electrically connected to one terminal of a resistor 414 and one terminal of a capacitor 416. The resistor 414 preferably has a value of 100 K-ohms and the capacitor 416 a value of 470 pf. The second terminal of the resistor 414 is electrically connected to the first input of the second exclusive OR gate 408 and the second terminal of the capacitor 416 is electrically connected to ground. The first and second exclusive OR gates 406 and 408, connected to the resistor-capacitor networks as shown and described, each functions as an edge detector. That is, the output of each exclusive OR gate will occur upon detection of a level transition in the signal from the Q output of the flip-flop to which each exclusive OR gate is connected.

The output of the first exclusive OR gate 406 is coupled to one input of a two input NOR gate 418 and one input of a two input AND gate 420. The output of the two input AND gate 420 is electrically connected to one input of a two input OR gate 422. The output of the two input NOR gate 418 is electrically connected to one input of a second two input NOR gate 424 and the input of a delay circuit 426. The output of delay circuit 426 is connected to the second input of AND gate 420. The delay circuit 426 preferably comprises a 100 K-ohm resistor which, in conjunction with the input capacitance of AND gate 420 delays the signal from NOR gate 418 to AND gate 420 by approximately 60 nanoseconds. In the preferred embodiment, the NOR gates 418 and 424 are RCA COS/MOS Type CD4001B Two Input Nor Gates. It is preferred that the AND gate 420 is an RCA COS/MOS Type CD4073B AND Gate and that the OR gate 422 is an RCA COS/MOS Type CD4071B OR Gate. The output of the second exclusive OR gate 408 is coupled to the second input of the two input OR gate 422. The output of OR gate 422 is coupled to the input of a one shot 430. In the preferred embodiment, the one shot 430 is an RCA COS/MOS Type CD4538D Precision Monostable Multivibrator, configured to produce an output pulse having a duration of approximately 0.11 milliseconds upon receipt of an input pulse.

The 2.16 kilohertz signal from the second divide by ten circuit 214 (see FIG. 2) is coupled to a first position of a low slip frequency range set switch 431. The 21.6 kilohertz signal from the first divide by ten circuit 206 (see FIG. 2) is coupled to a second position of the low slip frequency range set switch 431. The common terminal of switch 431 is coupled to a clock input of a decade rate multiplier 432. The slip frequency range set switch 431 is used to manually set the desired low set slip frequency range to either 0.01 to 0.09 Hz (first position) or 0.1 to 0.9 Hz (second position). In the preferred embodiment, the decade rate multiplier 432 is an RCA COS/MOS Type CD4527B BCD Rate Multiplier. The data inputs A, B, C and D of the decade rate multiplier 432 are selectably connected to logical "1" through contacts A through D of a low slip frequency set switch 434 as well as to one terminal of resistors 436, 438, 440 and 442 respectively. The other terminals of the resistors are electrically connected to ground. The low slip frequency set switch 434 is preferably a dip switch, used to manually set the desired low slip frequency limit in either 0.01 Hz or 0.1 Hz increments, depending upon selected position of slip frequency range set switch 431. The output of the decade rate multiplier 432 is connected to the input of a counter 444 and a clock input of a flip-flop 446. The counter 444 is preferably an RCA COS/MOS Type CD4020B Ripple-Carry Binary Counter/Divider. The flip-flop 446 is preferably an RCA COS/MOS Type CD4013B "D"-Type Flip-Flop.

Outputs $Q_9$, $Q_{11}$ and $Q_{13}$ of the counter 444 are connected to the inputs of a three input AND gate 448. The AND gate 448 is preferably an RCA COS/MOS Type CD4073B AND Gate. The output of AND gate 448 is coupled to the "D" input of flip-flop 446. The "R" input of flip-flop 446 is connected to ground (logical "0"). The "Q" output of flip-flop 446 is electrically connected to a clock input of a flip-flop 450 and a first input of a two input OR gate 452. The flip-flop 450 is preferably an RCA COS/MOS Type CD4013B "D"-Type Flip-Flop and the OR gate 452 is preferably an RCA COS/MOS Type CD4071B OR Gate. The output of the OR gate 452 is coupled to the "R" input of the counter 444.

The "S" input of the flip-flop 446 is coupled to the "R" input of the flip-flop 450 and both are connected to ground (logical "0"). The "D" input of the flip-flop 450 is electrically connected to logical "0". The "Q" output of flip-flop 450 is coupled to the "D" input of a flip-flop 454. In the preferred embodiment, flip-flop 454 is preferably an RCA COS/MOS Type CD4013B "D"-Type Flip-Flop. The "R" input of flip-flop 454 is connected to the "Q" output of flip-flop 446, the clock input of flip-flop 450 and the first input of the two input OR gate 452. The clock input of flip-flop 454 is electrically connected to one terminal of a resistor 456, the output of a two input OR gate 458 and the second input of the two input OR gate 452. The two input OR gate 458 is preferably an RCA COS/MOS type CD4071B OR Gate. The second terminal of the resistor 456 is electrically connected to one terminal of a capacitor 458 and the "S" input of the flip-flop 450. The second terminal of the capacitor 460 is electrically connected to ground. The resistor 456 preferably has a value of 100 K-ohms and the capacitor 460 preferably has a value of 47 pf.

The output of the one shot 430 is coupled to one input of the two input OR gate 458. The output of a two input AND gate 462 is coupled to the "S" input of the flip-flop 454 and the second input of the two input OR gate 458. In the preferred embodiment, the two input AND gate 462 is an RCA COS/MOS Type CD4073B AND Gate. The output of a three input OR gate 464 is coupled to one input of the two input AND gate 462. In the preferred embodiment, the OR gate 464 is an RCA COS/MOS Type CD4075B OR Gate. A signal "VUP" is coupled to the second input of the two input AND gate 462.

The output of an adjustable timer 466 is coupled to one input of the three input OR gate 464. A signal "DR" is coupled to the second input of the three input OR gate 464 and the $\overline{Q}$ output of flip-flop 404 is connected to the third input. A signal "LD" is connected to the input of the adjustable timer 466. It is preferred that the adjustable timer 466 be adjustable in the range of 0.05 to 1.65 minutes such that the output of the timer comprises a pulse having a pulse duration selectable from within this time range.

The synchronism check relay 10 operates as follows. In order to permit fast reclosing of the power circuit breaker 18 while setting a reasonably low slip cut-off frequency, the synchronism check relay 10 is provided with both high set 14 and low set 16 slip cut-off frequency circuits. The low slip cut-off frequency setting is based upon the maximum slip that can be tolerated and still allow reclosing. The high slip cut-off frequency setting is a function of the desired set closing angle and the time that the line has been de-energized.

Figure 5:
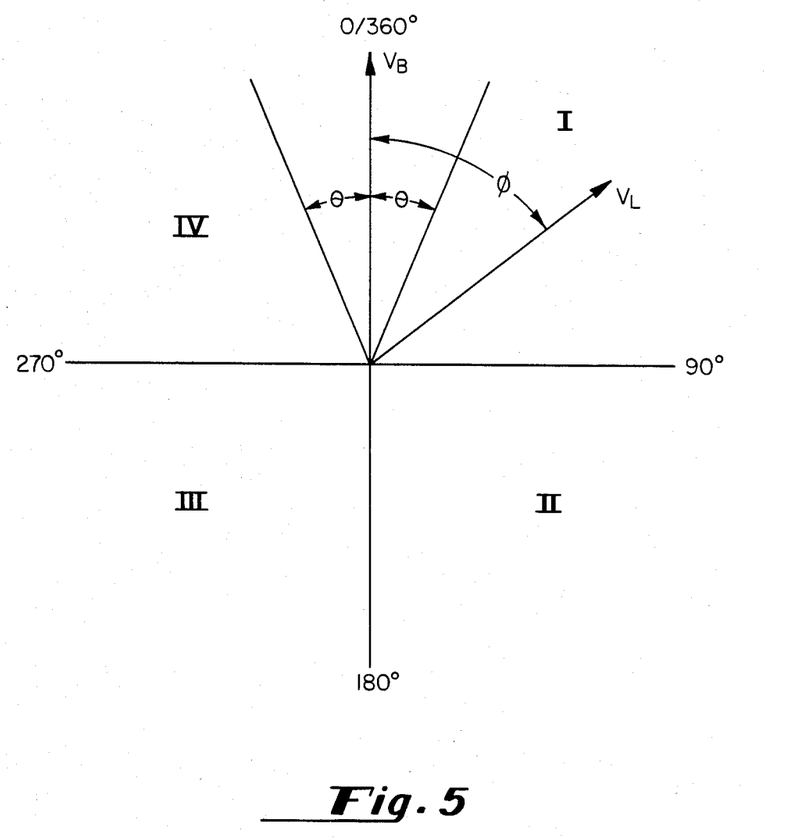
FIG. 5 is a phasor diagram depicting phase relationships between phasors representing bus voltage $V_B$ and line voltage $V_L$.

Referring to FIG. 5 there is shown a phasor diagram showing relative phase differences between bus voltage $V_B$ and line voltage $V_L$ appearing on either side of power circuit breaker 18 (see FIG. 1). For purposes of this description, $V_B$ is assumed to be fixed and is the reference voltage. The line voltage $V_L$ can appear anywhere relative to $V_B$ and may be rotating in either direction relative to $V_B$ if the systems on each side of the breaker 18 are out of synchronism.

If the line and bus voltages are in synchronism, but separated by an angle $\phi$, and the angle $\phi$ is greater than the predetermined set closing angle $\theta$, then the synchronism check relay 10 will not provide a closing enable signal to reclose relay 44 and closing will not be permitted. The means by which the preferred embodiment accomplishes this can best be understood by referring to FIG. 3. The signals representing the bus $V_B$ and line $V_L$ voltages are applied to the inputs of the exclusive OR gate 302. The exclusive OR gate will provide an output only during those periods when $V_B$ and $V_L$ are out of phase. The duration of the output from the OR gate 302 is a function of the magnitude of this phase difference. This signal is applied to the $\overline{APE}$ input of the down counter 304.

Upon the transition from low to high (logical "0" to logical "1") of the output of exclusive OR gate 302, the down counter 304 will begin to count down from the count which has been programmed into the JAM inputs $J_0$ through $J_7$ by the angle limit setting switches 306 and 308. If the down counter reaches zero before the output of the exclusive OR gate 302 goes from high to low (logical "1" to logical "0"), the ZD output of the down counter 304 will make a transition from high to low for one full clock period. This is an indication that the angle between $V_L$ and $V_B$, as represented by the duration of the output signal from exclusive OR gate 302, is greater than the predetermined set closing angle $\theta$ which was programmed by angle limit setting switches 306 and 308. The transition of the output at ZD from high to low causes the one shot 326 to generate a pulse from its $\overline{Q}$ output which, in the preferred embodiment, is fifteen milliseconds in duration. This $\overline{Q}$ pulse is applied to the $\overline{APE}$ input of the down counter 328.

Referring to FIG. 3, the decade rate multiplier 332, the down counter 344, the AND gate 330 and the down counter 328 together provide a time delay which is equal to the time it takes the $V_L$ phasor at the high slip frequency setting programmed by switch 344 to travel two times the angle set limit $\theta$ programmed by angle limit setting switches 306 and 308. If the phase angle $\phi$ between $V_B$ and $V_L$ remains within the angle set limit $\theta$ during this delay, the ZD output from down counter 328 will go to logical "0" which signifies that relay reclosing should be enabled. As previously described with respect to FIG. 1, this signal is inverted by inverter 42 and applied to one input of AND gate 40. If the other inputs to AND gate 40 are also logical ones, the AND gate 40 will provide a reclosing permitted signal to the reclosing relay 44.

As previously described, the ZD output from down counter 304 will make a transition from high to low if the phase angle $\phi$ between $V_B$ and $V_L$ exceeds the desired angle set limit $\theta$. This transition causes one shot 326 to generate a $\overline{Q}$ (low) output pulse for approximately fifteen milliseconds in duration; that is, the $\overline{Q}$ output goes from high to low for the fifteen millisecond period. As a result, if the phase angle $\phi$ between $V_B$ and $V_L$ drifts outside the angle set limit $\theta$ before the delay period is completed, the signal applied to the $\overline{APE}$ input of down counter 328 will go low since the $\overline{Q}$ output from one shot 326 is connected to the $\overline{APE}$ input of down counter 328. This causes the ZD output from down counter 328 to go high which causes the output from AND gate 40 to go low thereby signalling reclosing relay 40 to prevent reclosing of power circuit breaker 18 (see FIG. 1).

Examples of implementation of this time delay by the preferred embodiment of the angle and high set slip cut off circuit 14 of the present invention are as follows. First, assume slip frequency is set at one hertz by closing contact c of high slip frequency set switch 334. At a slip frequency of one hertz, the $V_L$ phasor will travel 360° in one second, or 1° every 2.78 milliseconds. With the slip frequency set at one hertz by switch 334, the output of rate multiplier 332 is 8.64 K-pulses per second (21.6 kilohertz×4/10). The output of down counter 344 will then be 180 pulses per second (8.64 K-pulses per second divided by 48). Consequently, a transition from high to low of the ZD output of down counter 344 will occur once every 5.56 milliseconds.

Assume the JAM inputs of the down counter 328 are set at 20° by closing contact b of angle set switch 308. Since the ZD output from down counter 344 is connected to the clock input of the down counter 328 through AND gate 330, a transition occurs at its clock input once every 5.56 milliseconds, assuming that the other input of AND gate 330 is high. Consequently, the ZD output from down counter 328 makes a transition once every 111.1 milliseconds. At a one hertz slip rate, the $V_L$ phasor will travel 40° (twice the angle set limit $\theta$ which was 20°) in 111.1 milliseconds (111.1 milliseconds divided by 2.78 milliseconds per degree equals 40°).

In a second example, assume the slip frequency is set at two hertz by closing contact d of high slip frequency set switch 334. At two hertz, the slip frequency phasor will travel 360° in 500 milliseconds or 1° every 1.39 milliseconds. The output of rate multiplier 332 will be 17.28 K-pulses per second (21.6 kilohertz×8/10). The output of down counter 344 will then be 360 pulses per second (17.28 K-pulses per second divided by 48). Consequently, a transition from high to low of the ZD output from down counter 344 will occur once every 2.78 milliseconds.

Assuming again that the JAM inputs of down counter 328 are set at 20° by angle set switch 308 and that its clock inputs makes a transition once every 2.78 milliseconds (again assuming that the other input of AND gate 330 is high), then the ZD output from down counter 328 will make a transition once every 55.56 milliseconds. At a two hertz slip rate, the $V_L$ phasor will travel 40° (twice the angle set limit $\theta = 20°$) in 55.56 milliseconds (55.56 milliseconds divided by 1.39 milliseconds per degree equals 40°).

Since the ZD output of the down counter 328 is coupled to the other input of the two input AND gate 330 and remains high (logical "1") until the down counter 328 has decremented to zero, the output of the AND gate 330 will clock through the signal from the ZD output of down counter 344 to the clock input of down counter 328 until transition at the ZD output from the decade counter 344 goes low as a result of the attainment of a zero count. At this time the output of the AND gate 330 will also go low, thereby inhibiting further input of the clock signal to down counter 328. Consequently, the ZD output of down counter 328 will remain low until it receives a $\overline{Q}$ pulse from one shot 326 at its $\overline{APE}$ input at which time it will return to high. In addition to causing ZD to go from low to high, the $\overline{Q}$ (low) pulse will reset the maximum count. The high signal now present at ZD will again cause the AND gate 330 to clock through the ZD signal from down counter 344, causing down counter 328 to decrement the maximum count set by angle set switches 306 and 308. Each time the one shot 326 generates a $\overline{Q}$ pulse before the down counter 328 decrements to zero (indicating that the phase angle $\phi$ between $V_L$ and $V_B$ has exceeded the set angle limit $\theta$), the maximum count will be reset and the ZD output will remain high thereby signalling the reclosing relay 44 to prevent reclosing of the breaker 18.

The operation of the low set slip cut-off circuit 16 will be described referring to FIG. 4. Assuming that the low set slip frequency is set at 0.01 hertz by placing range switch 431 in the first position and closing contact "a" of the low slip frequency limit set switch 434. At a slip frequency of 0.01 hertz, the $V_L$ phasor will travel 360° in 100 seconds or 1° every 277.8 milliseconds. In the 0.01 to 0.09 hertz range, as set by range switch 431, the input to the rate multiplier 432 is 2.16 kilohertz. Therefore, with the low slip frequency limit set at 0.01 Hz by switch 434, the output of rate multiplier 432 is 216 pulses per second (2.16 kilohertz×1/10). AND Gate 448 will have an output upon coincidence of high signals on outputs $Q_9$, $Q_{11}$ and $Q_{13}$ of counter 444. This coincidence occurs once every 5376 output pulses from rate multiplier 432. Consequently, AND gate 448 will have an output pulse once every 24.89 seconds (5376 divided by 216). Note that ideally, the coincidence should occur once every 5400 impulses causing the AND gate 448 to generate a pulse once every 25 seconds (5400 divided 216); however, the additional logic required to implement this ideal situation was not considered to be worth the small percentage error (approximately 0.43%) it would eliminate. Consequently, the preferred embodiment is as shown and described herein.

At a 0.01 hertz slip frequency, the $V_L$ phasor will travel 90° in 25 seconds, since it takes 277.8 milliseconds to travel 1° (277.8 milliseconds×90). The output of the AND gate 448 is coupled to the D input of the flip-flop 446. Therefore, the Q output of flip-flop 446 is one pulse every 90° of slip frequency as set by the low slip frequency limit set switch 434. The Q output of flip-flop 446 will reset counter 444 through OR gate 452. The Q output of flip-flop 446 will also reset flip-flop 454 which causes the $\overline{Q}$ output of flip-flop 454 to go high. The Q output of flip-flop 446 is also connected to the clock input of flip-flop 450. A positive transition of the signal from Q output of flip-flop 446 causes the signal on the D input of flip-flop 450 (permanently tied to low) to be clocked to the Q output of flip-flop 450. Consequently, assuming no other signals for the present, the Q output from flip-flop 446, which provides a pulse every 90° of low slip frequency setting, resets counter 44; resets flip-flop 454 (causing $\overline{Q}$ to go high); and clocks a low (or logical "0") into the Q output of flip-flop 450.

As previously described, the square wave signals representing the bus voltage $V_B$, the line voltage $V_L$ and the line voltage phase shifted by 90° $V_{L90}$, are connected to the "D" inputs of flip-flops 402 and 404, the clock inputs of flip-flop 402 and the clock input of flip-flop 404 respectively. Assuming $V_B$ is the phase reference voltage and $V_B$ is a logical "1" (high) in quadrants I and II and a logical "0" (low) in quadrants III and IV, then when $V_L$ is in quadrant I and $V_{L90}$ is in quadrant II, the Q output of flip-flop 402 will be high and the Q output of flip-flop 404 will also be high since $V_B$, which is connected to the "D" inputs of both flip-flops, is high in quadrants I and II. When $V_L$ is in quadrant II and $V_{L90}$ is in quadrant III with respect to $V_B$, the Q output of flip-flop 402 will be high and the Q output of flip-flop 404 will be low since $V_B$ is high in quadrant II and low in quadrant III. Similarly, when $V_L$ is in quadrant III and $V_{L90}$ is in quadrant IV, the Q outputs of flip-flops 402 and 404 will be low since $V_B$ is low in quadrants III and IV. Finally, when $V_L$ is in quadrant IV and $V_{L90}$ is in quadrant I, the Q output of flip-flop 402 will be low while the Q output of flip-flop 402 wil be high since $V_B$ is low in quadrant IV and high in quadrant I.

Edge detector 406 will produce a pulse when the phase difference between $V_L$ and $V_B$ is 0° since the Q output from flip-flop 402 will change from low to high as $V_L$ moves from quadrant IV to quadrant I. Edge detector 406 will also produce a pulse at 180° since the Q output of flip-flop 402 will make a transition from high to low as $V_L$ moves from quadrant II to quadrant III. Since the Q output of flip-flop 402 remains in its previous state when $V_L$ moves from quadrants I to II and III to IV, edge detector 406 will not produce pulses at 90° or 270°. Similarly, edge detector 408 will produce a pulse at 90° since the Q output from flip-flop 404 makes transition from high to low as $V_L$ moves from quadrant I to quadrant II. Edge detector 408 will also produce a pulse at 270° since the Q output of flip-flop 404 will make a transition from low to high as $V_L$ proceeds from quadrant III to quadrant IV. Edge detector 408 will not produce outputs at 0° and 180° since the Q output remains in its previous state when $V_L$ moves from quadrants IV to I and II to III.

The output of edge detector 406 is coupled to the circuit comprising NOR gates 418 and 424, AND gate 420 and delay 426. The purpose of this circuit is to eliminate the possibility of rapidly produced pulses due to jitter caused by $V_L$ shifting rapidly back and forth around the 0° point with respect to $V_B$ when $V_L$ and $V_B$ are substantially in phase. In other words, this circuit will eliminate extraneous "in-phase" pulses due to component induced errors such as potential transformer mismatches, etc. Since the ZD output of down counter 328 (see FIG. 3) is connected to one input of NOR gate 424, and since ZD is high when the phase angle $\phi$ is greater than the high slip frequency limit setting $\theta$ and low when the phase angle $\phi$ is within the high slip frequency limit $\theta$, the output of NOR gate 424 will remain low as long as the phase angle $\phi$ is greater than the high slip frequency setting $\theta$. Consequently, NOR gate 418 will output a negative pulse each time edge detector 406 outputs a pulse at 0° and 180°. Since this negative pulse is delayed by delay circuit 426, AND gate 420 will produce an output pulse each time edge detector 406 outputs a pulse at 0° and 180°. In addition, the delay circuit will permit the first pulse to pass through AND gate 420 but will prevent closely following pulses resulting from dither about 0° from passing through.

When the phase angle $\phi$ is within the high slip frequency set limit $\theta$, ZD remains low which causes the output of NOR gate 424 to remain high. Since the output of NOR gate 424 is coupled to one input of NOR gate 418, a high at the output of NOR gate 424 will cause the output of NOR gate 418 to remain low. This causes AND gate 420 to block any signal output to OR gate 422. Also, since phase angle $\phi$ is within high slip frequency set limit $\theta$, no pulses will be output from edge detector 408 since phasor $V_L$ and concomitantly phasor $V_{L90}$, is not rotating with respect to $V_B$. Consequently, one shot 430 will not produce any pulses when phase angle $\phi$ is within slip frequency set limit $\theta$.

When the phase angle $\phi$ is greater than the high slip frequency setting $\theta$, the output of AND gate 420 will be a pulse at 0° and a pulse at 180° while the output of edge detector 408 will be a pulse at 90° and a pulse at 270°. These pulses represent the actual phase shift slip beteen $V_L$ and $V_B$ and there will be four pulses every actual slip cycle. These pulses are coupled to one shot 430 which will output one pulse having a duration of 0.11 milliseconds for each input pulse. These output pulses are coupled, through OR gate 458, to the set input of flip-flop 450, through a delay circuit formed by resistor 456 and capacitor 460; the clock input of 454; and, through OR gate 452, the reset input of the counter 444. Consequently, each 90° pulse generated by the actual slip cycle, will reset counter 444; clock the signal present at the D input of flip-flop 454 to its Q output; and, after a delay imparted by RC delay circuit, set flip-flop 450.

Assuming a low signal at the Q output of 450, which is coupled to the D input of flip-flop 454, the pulse from one shot 430 will cause the $\overline{Q}$ output of 454 to go high; will reset the counter 444; and, after the imparted delay, will set flip-flop 450 which in turn will cause the Q output of flip-flop 450 to go high. The next pulse from one shot 430 will clock the high signal on the D input of flip-flop 454 causing the $\overline{Q}$ output of flip-flop 454 to go low; will again reset counter 444; and will again, after the imparted delay, set flip-flop 450 causing the Q output thereof to remain high. Since the Q signal from flip-flop 454 is coupled to one input of AND gate 40 (see FIG. 1), a low signal at the $\overline{Q}$ output of flip-flop 454 causes the reclosing relay 44 to prevent reclosing of the circuit breaker 18.

Consequently, it can be seen that if the rate of output pulses from the one shot 430 representing the actual slip cycle frequency, exceeds the low slip frequency setting (that is, the output pulses from one shot 430 occur before the Q output signals from flip-flop 446), the $\overline{Q}$ output of flip-flop 454 will remain low, blocking the breaker reclosing. If the output pulses from one shot 430 occur at a frequency which is less than the low set slip frequency setting (that is, the Q output signal from flip-flop 446 occur before the output pulses from one shot 430), the $\overline{Q}$ output of flip-flop 454 will remain high. Consequently, if the other inputs to AND gate 40 are high (logical ones), the AND gate 40 will provide a reclosing permitted signal to the reclosing relay 44.

It can be seen from the above description of the operation of the preferred embodiment of the angle and high set slip cut-off circuit 14, if the angle $\phi$ between $V_L$ and $V_B$ is greater than the set closing angle $\theta$, then the synchronism check function will not provide a signal to the reclosing relay 44 enabling reclosing of the power circuit breaker 18. If the angle $\phi$ between $V_L$ and $V_B$ is less than the set closing angle $\theta$, then the synchronism check function will operate and permit closing but only after a time delay that is related to the high slip cut-off frequency setting $F_H$ and the set closing angle $\theta$. This time delay $T_H$ is $T_H = 1000\theta/F_H 180$ where $T_H$ is the time delay in milliseconds, $F_H$ is the high slip cut-off setting in hertz and $\theta$ is the set closing angle in degrees. Preferably, the high set slip cut-off frequency $F_H$ is set equal to the slip frequency required to traverse $(270-\theta)°$ during the time that the line is dead. That is $F_H = 270 - \theta)/(360)(T_D)$ where $T_D$ is the dead time setting in seconds.

The high slip cut-off frequency setting $F_H$ is based on $(270-\theta)°$ to ensure that if the slip rate is less than $F_H$, $V_L$ will return in the second or third quadrant. If the slip rate is less than $F_H$, $V_L$ can only have travelled out of phase during the dead time far enough to reappear in quadrants II or III, unless the slip rate was moving very slowly. If $V_L$ does return in quadrants II or III, the low slip cut-off frequency measurement will be set up and the actual slip will have to be less than the low slip cut-off setting to permit reclosing. As shown in FIG. 4, the $\overline{Q}$ output of flip-flop 404 is coupled to one input of OR gate 464. The $\overline{Q}$ output of flip-flop 404 is high in quadrants II and III since the Q output is low in these quadrants as previously described. A high at an input to OR gate 464 will be coupled to one input of AND gate 462. Since VUP will be high for approximately 100 microseconds following re-establishment of $V_L$ in the preferred embodiment, AND gate 462 will provide a high output during this period whenever $V_L$ appears in quadrants II and III; that is, whenever the phase difference between the line voltage $V_L$ and the bus voltage $V_B$ is in a range of between 90° to 270° as shown in FIG. 5. A high from AND gate 462 will reset counter 444, reset flip-flop 450, and clock $\overline{Q}$ of flip-flop 454 low. This prevents an enabling signal from AND gate 40 until a determination is made that the slip frequency is within the low set limits as previously described.

There are three possible conditions that might cause $V_L$ to appear in quadrants I or IV when the line is re-energized. One condition is a slip frequency that is higher than $F_H$. In this case, the high slip cut-off circuit will prevent reclosing. A second condition is a very low slip frequency. For this condition, reclosing will be permitted providing that $V_L$ remains within the closing angle $\theta$ for the time associated with the high slip cut-off setting. If $V_L$ has not moved outside the closing angle $\theta$ during the time that the line was de-energized, there is little risk in permitting reclosing without making a low slip cut-off measurement.

The third condition that might cause $V_L$ to appear in quadrants I or IV is a reclosing attempt that has been delayed longer than the normal reclosing time. An example of such a delayed reclosure would be a manual closing of the breaker. In the preferred embodiment, an output from the timer 466 resets counter 444, resets flip-flop 450, and clocks Q of flip-flop 454 low. This prevents an enabling signal from AND gate 40 until a determination is made that the slip frequency is within the low set limits as previously described. The input LD to timer 466 is energized when the line voltage $V_L$ is less than the "dead line" voltage setting. The pick-up delay $D_T$ of timer 466 is set for the time that the line is de-energized plus a suitable margin. For example, in the preferred embodiment $D_T = [(\text{time that line is de-energized}) + (\text{channel time})] \times 1.1$. The channel time is the communication time from one relay to another. This communication can occur, for example, by dedicated phone line, microwave links, etc. The channel time is included to account for possible differences in clearing time of the two line terminals due to a channel trip at one terminal and a direct trip at the other. A channel trip occurs when the relay receives a trip signal from another relay. A direct trip occurs when the relay senses the fault itself, then trips the breaker directly.

If the line and bus voltages are out of synchronism, and the $V_L$ phasor is rotating relative to the $V_B$ phasor, and if the voltage $V_L$ plots in quadrants I or IV when the voltage is reestablished; and if it enters the set closing angle $\theta$ without entering either quadrants II or III, and if it remains within the closing angle longer than the time corresponding to the high slip cut-off setting, then a sync-check output will be provided after a time delay established by the high slip cut-off setting as previously described.

As can be seen from this description, if the line voltage $V_L$ returns in quadrants II or III, or rotates into quadrants II or III from I or IV, the low slip cut-off circuit 16 is enabled and used to supervise the closing angle and high slip cut-off circuits. Thus, a sync check output cannot be produced unless the slip is less than the low slip cutoff setting and the voltage $V_L$ remains within the closing angle for the time established by the high slip cut-off setting.

The low set slip frequency cut-off circuit establishes the slip rate by comparing the time that $V_L$ remains in any quadrant against a reference time established by the low set slip cut-off setting. This reference time is the time it takes the voltage phasor $V_L$ to traverse 90° at a frequency equal to the low slip cut-off setting. This is expressed by the functional relationship: $T_L = \frac{1}{4} \times 1/F_L$ where $F_L$ is the low slip cut-off setting and $T_L$ is the time required to traverse 90°. If $V_L$ remains in a quadrant longer than the reference time, then the slip rate is less than the low slip cut-off setting and the circuit will produce a permissive output signal to enable the angle and high slip cut-off circuits. The low slip cut-off measurement is started whenever $V_L$ enters a new quadrant; however, if a permissive signal was generated in the previous quadrant, it will remain unless the slip is determined to be greater than the low slip cut-off, at which time the permissive signal will be removed.

If $V_L$ returns in quadrant II and is rotating in a counter-clockwise direction, the low set slip cut-off circuit will produce a permissive output to the angle and the high set slip cut-off circuits only if $V_L$ remains in quadrant II longer than the time established by the low slip cut-off setting. After $V_L$ enters quadrant I, reclosing will be permitted after $V_L$ has entered the set closing angle and remains there for a time established by the high set slip cut-off frequency.

If $V_L$ returns in quadrant II but does not remain in that quadrant for the time established by the low slip cut-off setting, then the low set slip cut-off circuit will block reclosing. However, after $V_L$ enters quadrant I, a new measurement will be started and if $V_L$ remains in quadrant I longer than the time established by the low slip cut-off setting, the low slip cut-off circuit will produce a permissive output which will enable the high set slip cut-off and angle check circuits. Reclosing will then be permitted if the voltage $V_L$ is within the closing angle (or enters the closing angle) and remains there for a time established by the high set slip cut-off setting.

Similar operation will occur if $V_L$ returns in quadrant III and is rotating in a clockwise direction. If $V_L$ returns in quadrant III and is rotating counter-clockwise, the low set slip cut-off measurement made in that quadrant is inconsequential because reclosing cannot occur until $V_L$ enters the closing angle in quadrant I. Therefore, the evaluation of this slip rate made in quadrant II will determine the operation.

In the preferred embodiment, a sync check output can be prevented unless a low slip cut-off measurement is made and satisfied by providing a high DR signal to the OR gate 464 (see FIG. 4). In this mode of operation, after the frequency is determined to be less than the low slip cut-off setting, the voltage $V_L$ must still remain in the closing angle for a time established by the high set slip cut-off circuit. This is so even though the high set slip cut-off feature is not operational. A minimum delay will be obtained by setting the high set slip cut-off frequency to its maximum setting, using switch 334 (see FIG. 3).

While the principles of the invention have now been made clear in an illustrative embodiment, there will be obvious to those skilled in the art, many modifications of elements, components and arrangement thereof used in the practice of the invention and otherwise, which are particularly adapted for specific environments and operating requirements without departing from those principles. The appended claims are, therefore, intended to cover and embrace any such modifications within the limits only of the true spirit and scope of the invention.

I claim:

1. An apparatus for determining synchronism between first and second voltages present on opposite sides of an open circuit breaker in an AC power distribution system, said apparatus comprising:
   a. means for setting a closing angle limit $\theta$;
   b. means for setting a high slip frequency limit $F_H$;
   c. means for setting a low slip frequency limit $F_L$;
   d. means for measuring phase angle difference $\phi$ between said first and second voltages;
   e. means for measuring slip frequency $F_S$ between said first and second voltages;

f. means for comparing $\phi$ with $\theta$ and generating a circuit breaker reclose enable signal whenever $\phi$ remains less than $\theta$ for a predetermined period of time $T_H$ which is a function of $F_H$; and g. means for detecting predetermined low set measurement conditions and, whenever said measurement conditions are detected, comparing $F_S$ with $F_L$ and preventing the generation of said reclose enable signal when $F_S$ is greater than $F_L$.

2. An apparatus in accordance with claim 1 wherein said means for setting a closing angle limit $\theta$ comprises:

a. means for generating at least a first clock signal having a predetermined frequency; and b. first programmable down counter means, responsive to said first clock signal, for providing a first output signal upon decrementing to zero, at said clock frequency, a first programmed count which corresponds to said closing angle limit $\theta$ setting.

3. An apparatus in accordance with claim 2 wherein said means for generating at least a first clock signal comprises means for generating a first clock signal having a frequency of 21.6 kilohertz and a second clock signal, having a frequency of eighteen kilohertz.

4. An apparatus in accordance with claim 2 wherein said means for measuring phase angle difference $\phi$ between said first and second voltages comprises:

a. means for providing an out of phase signal whenever, and for substantially as long as, the polarities of said first and second voltages are different; and b. means for preventing the occurrence of said first output signal from said first programmable down counter means whenever the duration of said out of phase signal is less than the time necessary for said first programmable down counter means to decrement said programmed count to zero.

5. An apparatus in accordance with claim 4 wherein said means for providing said out of phase signal comprises:

a. means for converting said first and second voltages to first and second square wave signals respectively, said first square wave signal being substantially in phase with said first voltage and said second square wave signal being substantially in phase with said second voltage; and b. exclusive OR means responsive to said first and second square wave signals for generating an output pulse whenever the polarity of said second square wave signal differs from the polarity of said first square wave signal, the duration of said output pulse being substantially equal to the duration of polarity difference between said first and second square wave signals.

6. An apparatus in accordance with claim 2 wherein said means for setting said high slip frequency limit $F_H$ comprises:

a. means for generating a third clock signal having a predetermined frequency; and b. first programmable rate multiplier means, responsive to said third clock signal, for providing a fourth clock signal having a pulse rate which is substantially equal to said third clock signal frequency divided by a second programmed count which corresponds to high slip frequency limit $F_H$ setting.

7. An apparatus in accordance with claim 6 wherein said means for generating a circuit breaker reclose signal comprises:

a. means, responsive to said fourth clock signal, for generating a fifth clock signal having a pulse rate which is proportional to the pulse rate of said fourth clock signal; and b. second programmable down counter means, responsive to said fifth clock signal and said first output signal from said first programmable down counter means, for providing said reclose enable signal upon decrementing said first programmed count to zero, at the pulse rate of said fifth clock signal, and for preventing the occurence of said reclose enable signal upon receipt of said first output signal from said first programmable down counter means.

8. An apparatus in accordance with claim 1 wherein said means for setting a low slip frequency limit $F_L$ comprises:

a. means for generating at least a sixth clock signal having a predetermined frequency;

b. second programmable rate multiplier means, responsive to said sixth clock signal, for providing a seventh clock signal having a pulse rate which is substantially equal to said sixth clock signal frequency divided by a third programmed count which corresponds to said low slip frequency limit $F_L$ setting; and c. counter means, responsive to said seventh clock signal, for providing a low slip frequency limit signal comprising a series of pulses, the interval between said pulses being substantially equal to one-quarter of the period of said low slip frequency limit $F_L$.

9. An apparatus in accordance with claim 8 wherein said means for generating at least a sixth clock signal comprises means for generating a clock signal having a frequency of 21.6 kilohertz or a clock signal having a frequency of 2.16 kilohertz.

10. An apparatus in accordance with claim 1 wherein said means for measuring slip frequency $F_S$ between said first and second voltages comprises:

a. means for converting said first and second voltages to first and second square wave signals respectively, said first square wave signal being substantially in phase with said first voltage and said second square wave signal being substantially in phase with said second voltage;

b. means for generating a third square wave signal which is substantially 90° out of phase with respect to said second voltage; and c. means, responsive to said first, second and third square wave signals, for producing a slip frequency signal which comprises a pulse when said first and second voltages are substantially in phase, a pulse when the phase difference between said first and second voltages is substantially equal to 90°, a pulse when said phase difference is substantially equal to 180°, and a pulse when said phase difference is substantially equal 270°.

11. An apparatus in accordance with claim 10 wherein said means for producing said slip frequency signal comprises:

a. first flip-flop means, responsive to said first and second square wave signals, for producing a pulse when said first and second voltages are substantially in phase and for producing a pulse when said first and second voltages are substantially 180° out of phase; and b. second flip-flop means, responsive to said first and third square wave signals, for producing an output pulse when said first and third square wave signals are substantially in phase, corresponding to an output pulse when said first and second voltages are substantially 90° out of phase, and an output pulse when said first and third square wave voltages are substantially 180° out of phase, corresponding to an output pulse when said first and second voltages are substantially 270° out of phase.

12. An apparatus in accordance with claim 11 wherein said means for detecting predetermined low set measurement conditions comprises means for providing a signal whenever the phase difference between said second voltage and said first voltage is in a range of 90° to 270°.

13. An apparatus in accordance with claim 12 wherein said means for providing a signal whenever the phase difference between said second voltage and said first voltage is in a range of 90° to 270° comprises said second flip-flop means, responsive to said first and third square wave signals, for producing an output when the phase difference between said first and third square wave signals is in a range of 0° to 180°.

14. An apparatus in accordance with claim 12 wherein said means for detecting predetermined low set measurement conditions additionally comprises timing means for providing an output signal whenever the amplitude of said second voltage remains less than a predetermined magnitude for a predetermined period of time.

15. An apparatus in accordance with claim 14 wherein said means for comparing $F_S$ with $F_L$ comprises means for comparing the interval between said slip frequency signal pulses with the interval between said low slip frequency limit signal pulses and providing a reclose prevent signal when the interval between two sequential slip frequency signal pulses is less than the interval between two sequential low slip frequency limit signal pulses.

16. A method for determining synchronism between first and second voltages present on opposite sides of an open circuit breaker in an AC power distribution system, said method comprising the steps of:
   a. setting a closing angle limit $\theta$;
   b. setting a high slip frequency limit $F_H$;
   c. setting a low slip frequency $F_L$;
   d. measuring phase angle difference $\phi$ between first and second voltages;
   e. measuring slip frequency $F_S$ between said first and second voltages;
   f. comparing $\phi$ with $\theta$ and generating a circuit breaker reclose enable signal whenever $\phi$ remains less than $\theta$ for a predetermined period of time $T_H$; and
   g. detecting predetermined low set measurement conditions and, whenever said measurement conditions are detected, comparing $F_S$ with $F_L$ and preventing the generation of said reclose enable signal when $F_S$ is greater than $F_L$.

17. The method in accordance with claim 16 wherein the step of setting a closing angle limit $\theta$ comprises the steps of:
   a. generating at least a first clock signal having a predetermined frequency; and
   b. providing first programmable down counter means, responsive to said first clock signal, for providing a first output signal upon decrementing to zero, at said first clock frequency, a first programmed count which corresponds to said closing angle limit $\theta$ setting.

18. The method in accordance with claim 17 wherein said step of measuring phase angle difference $\phi$ between said first and second voltages comprises the steps of:
   a. converting said first and second voltages to first and second square wave signals respectively, said first square wave signal being substantially in phase with said first voltage and said second square wave signal being substantially in phase with said second voltage;
   b. generating a phase difference pulse whenever the polarity of said second square wave signal differs from the polarity of said first square wave signal, the duration of said phase difference pulse being substantially equal to the duration of polarity difference between said first and second square wave signal; and
   c. preventing the occurrence of said first output signal from said first programmable down counter means whenever the duration of said phase difference pulse is less than the time necessary for said programmable down counter means to decrement said programmed count to zero.

19. The method in accordance with claim 16 wherein said step of setting said high slip frequency limit $F_H$ comprises the steps of:
   a. generating a third clock signal having a predetermined frequency; and
   b. a fourth clock signal having a pulse rate which is substantially equal to said third clock signal frequency divided by a second programmed count which corresponds to said high slip frequency limit $F_H$ setting.

20. A method in accordance with claim 19 wherein the step of generating a circuit breaker reclose signal comprises the steps of:
   a. generating a fifth clock signal having a pulse rate which is proportional to the pulse rate of said fourth clock signal; and
   b. providing second programmable down counter means, responsive to said fifth clock signal and said first output signal from said first programmable down counter means, for providing said reclose enable signal upon decrementing said first programmed count to zero, at the pulse rate of said fifth clock signal, and for preventing the occurrence of said reclose enable signal upon receipt of said first output signal from said first programmable down counter means.

21. The method in accordance with claim 16 wherein said step of setting a low slip frequency limit $F_L$ comprises the steps of:
   a. generating at least a sixth clock signal having a predetermined frequency;
   b. providing a seventh clock signal having a pulse rate which is substantially equal to said sixth clock signal frequency divided by a third programmed count which corresponds to said low slip frequency limit $F_L$ setting; and
   c. providing a low slip frequency limit signal comprising a series of pulses, the interval between said pulses being substantially equal to one-quarter of the period of said low slip frequency limit $F_L$.

22. The method in accordance with claim 16 wherein the step of measuring slip frequency $F_S$ between first and second voltages comprises the steps of:

a. converting said first and second voltages to first and second square wave signals respectively, said first square wave signal being substantially in phase with said first voltage and said second square wave signal being substantially in phase with said second voltage;

b. generating a third square wave signal which is substantially 90° out of phase with respect to said second voltage; and c. producing a slip frequency signal which comprises a pulse when said first and second voltages are substantially in phase, a pulse when the phase difference between said first and second voltages is substantially equal to 90°, a pulse when said phase difference is substantially equal to 180°, and a pulse when said phase difference is substantially equal to 270°.

23. The method in accordance with claim 22 wherein the step of producing said slip frequency signal comprises the steps of:

a. providing means, responsive to said first and second square wave signals, for producing a pulse when said first and second voltages are substantially in phase and for producing a pulse when said first and second voltages are substantially 180° out of phase; and b. providing means, responsive to said first and third square wave signals, for producing an output pulse when said first and third square wave signals are substantially in phase, corresponding to an output pulse when said first and second voltages are substantially 90° out of phase, and an output pulse when said first and third square wave voltages are substantially 180° out of phase, corresponding to an output pulse when said first and second voltages are substantially 270° out of phase.

24. The method in accordance with claim 23 wherein the step of comparing $F_S$ with $F_L$ comprises means for comparing the interval between said slip frequency signal pulses with the interval between said low slip frequency limit signal pulses and providing a reclose prevent signal when the interval between two sequential slip frequency signal pulses is less than the interval between two sequential low slip frequency limit signal pulses.

25. The method in accordance with claim 16 wherein the step of detecting predetermined low set measurement conditions comprises the steps of:

a. providing a signal whenever the phase difference between the second voltage and the first voltage is in a range of 90° to 270°; and b. providing a signal whenever the amplitude of said second voltage remains less than a predetermined magnitude for a predetermined period of time.

26. An apparatus in accordance with claim 1 wherein said predetermined low set measurement conditions include conditions wherein the phase difference between said second voltage and said first voltage is in the range of 90° to 270°.

27. An apparatus in accordance with claim 26 wherein said means for detecting predetermined low set measurement conditions additionally comprises timing means for preventing generation of said reclose enable signal if the amplitude of said voltage remains less than a predetermined magnitude for a predetermined period of time.

* * * * *